(12) United States Patent
Pauly et al.

(10) Patent No.: US 8,286,916 B2
(45) Date of Patent: Oct. 16, 2012

(54) RETRACTABLE AERODYNAMIC DEVICE PERMITTING THE CONTROL OF THE WAKE TRAJECTORY OF AN AIRCRAFT TRAP

(75) Inventors: Bernard Pauly, Blagnac (FR); Bruno Chauveau, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 810 days.

(21) Appl. No.: 12/165,965

(22) Filed: Jul. 1, 2008

(65) Prior Publication Data
US 2009/0014591 A1 Jan. 15, 2009

(30) Foreign Application Priority Data

Jul. 13, 2007 (FR) ...................................... 07 56478

(51) Int. Cl.
*B64C 1/14* (2006.01)
(52) U.S. Cl. ................... 244/129.5; 244/129.4; 244/130
(58) Field of Classification Search .............. 244/110 D, 244/130, 129.4, 129.5, 137.1
See application file for complete search history.

(56) References Cited

U.S. PATENT DOCUMENTS

| | | | | | |
|---|---|---|---|---|---|
| 2,548,832 | A | * | 4/1951 | Tydon ........................... | 244/101 |
| 2,749,064 | A | * | 6/1956 | Kuhlman, Jr. .............. | 244/137.1 |
| 2,814,800 | A | * | 11/1957 | Martin et al. ................. | 343/708 |
| 4,408,736 | A | * | 10/1983 | Kirschbaum et al. ..... | 244/100 R |
| 6,098,925 | A | | 8/2000 | Burdsall, II | |
| 6,296,202 | B1 | * | 10/2001 | Stanek .......................... | 244/1 N |
| 6,739,554 | B1 | * | 5/2004 | Stanek ....................... | 244/137.1 |
| 7,651,053 | B2 | * | 1/2010 | Fort .......................... | 244/129.4 |
| 2006/0032981 | A1 | * | 2/2006 | Fort .......................... | 244/129.4 |

FOREIGN PATENT DOCUMENTS

| | | |
|---|---|---|
| EP | 1 588 938 A1 | 10/2005 |
| GB | 716600 | 10/1954 |

* cited by examiner

*Primary Examiner* — Philip J Bonzell

(74) *Attorney, Agent, or Firm* — Oblon, Spivak, McClelland, Maier & Neustadt, L.L.P.

(57) ABSTRACT

An aircraft provided with a wall having an exterior surface in contact with air flows external to the aircraft, an internal cavity in the aircraft, recessed relative to the exterior surface of the wall, at least one mobile trapdoor, which in closed position prolongs the exterior surface in such a way as to shut off the cavity from the exterior, and which in open position projects relative to the exterior surface in such a way as to open the cavity to the exterior, and provided with at least one mobile aerodynamic deflector, whose movement is slaved to that of the at least one trapdoor, the at least one aerodynamic deflector projecting relative to the exterior surface in a zone thereof situated outside the zone covered by the at least one trapdoor when the at least one trapdoor is open.

9 Claims, 4 Drawing Sheets

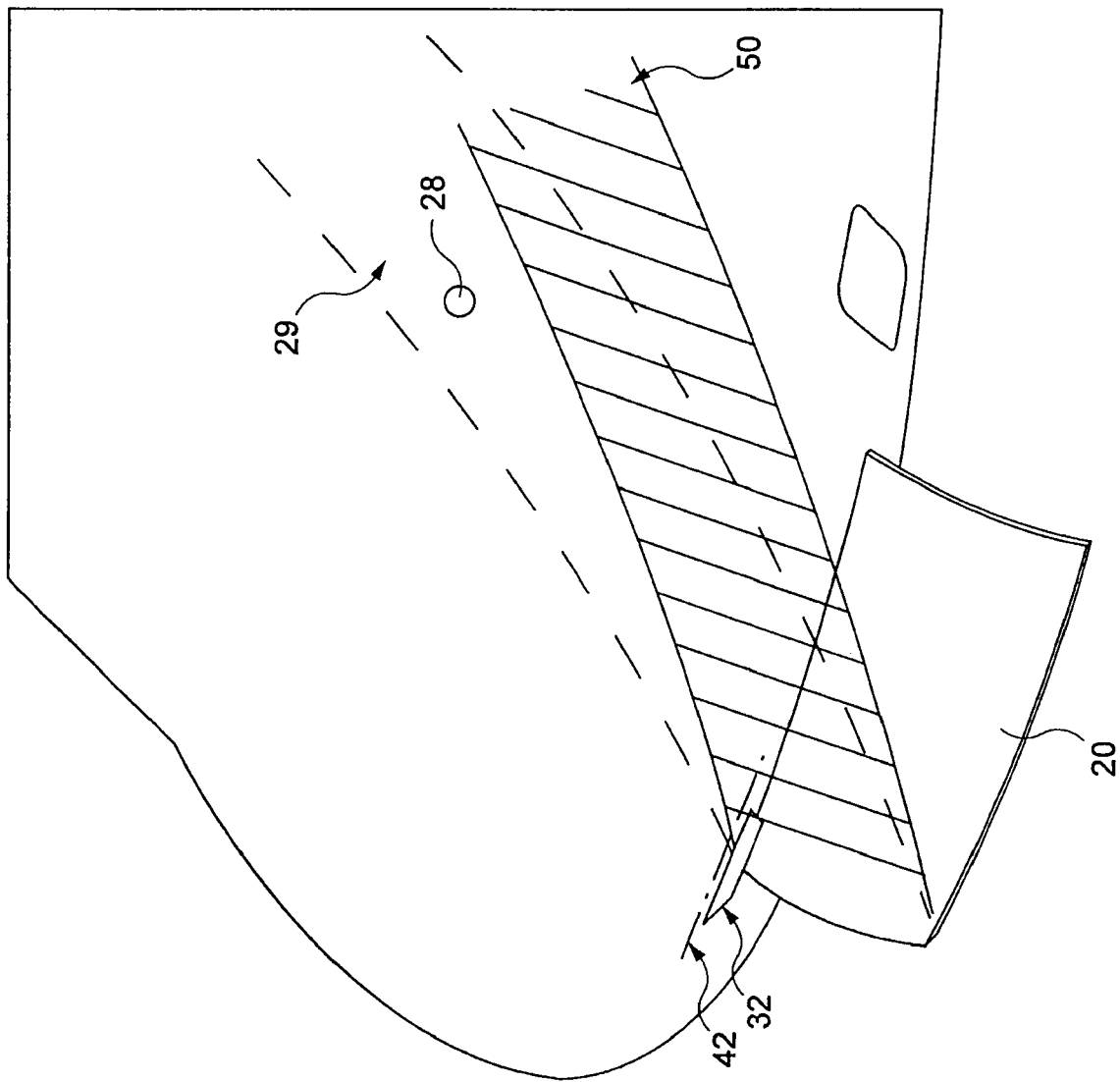

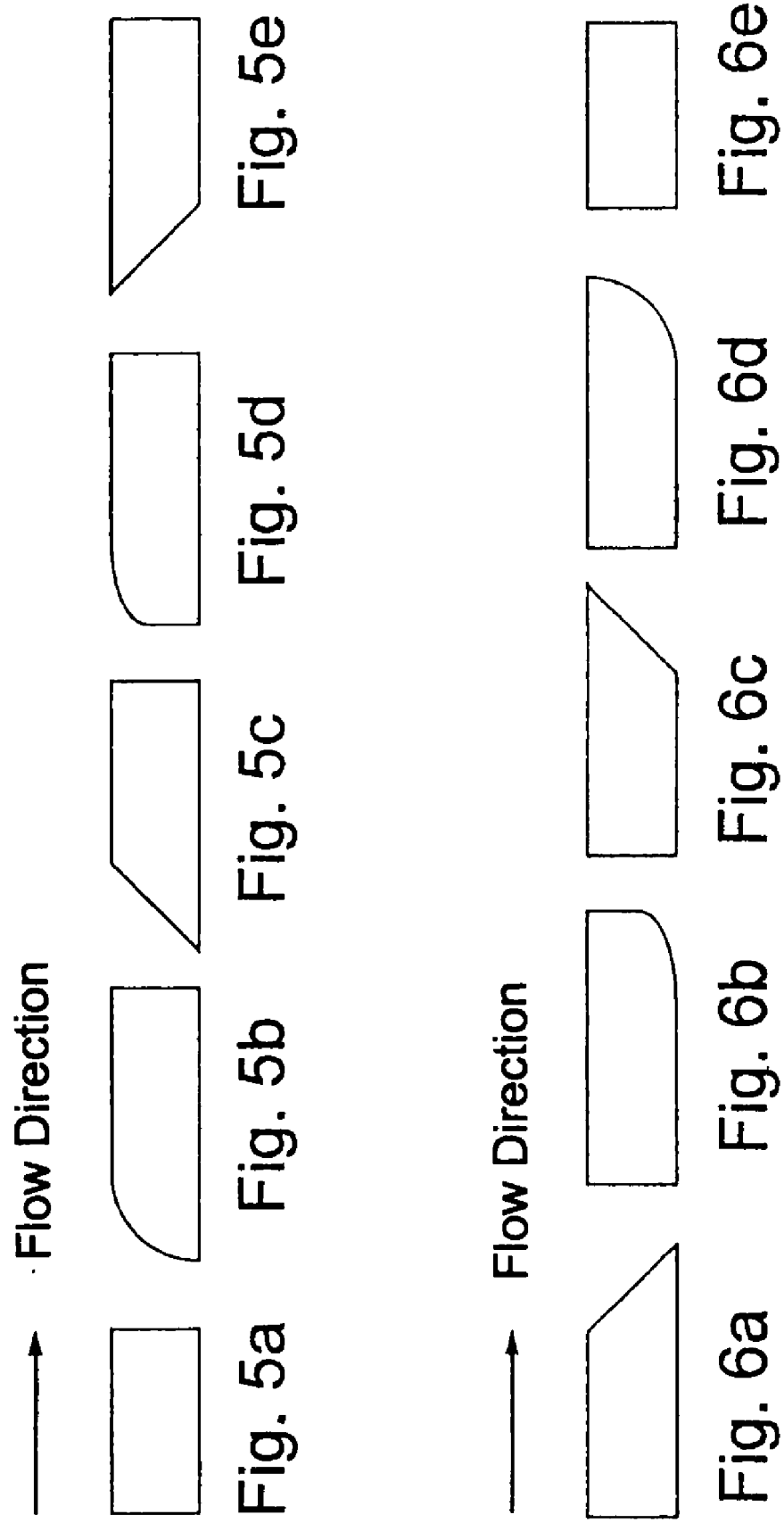

RETRACTABLE AERODYNAMIC DEVICE PERMITTING THE CONTROL OF THE WAKE TRAJECTORY OF AN AIRCRAFT TRAP

CROSS-REFERENCE TO RELATED APPLICATIONS

This application is based upon and claims priority under 35 U.S.C. §119 from French Patent Application Ser. No. 07/56478, filed Jul. 13, 2007.

BACKGROUND OF THE INVENTION

1. Field of the Invention

The present invention relates to an aircraft and more particularly to an aerodynamic device that ensures control of the trajectory of the wake of an aircraft trapdoor.

2. Description of the Related Art

It is known to have on an aircraft elements such as doors or trapdoors that are opened or closed for respectively opening or closing an internal cavity of the aircraft.

The trapdoors of a landing gear constitute an example of these elements.

When such elements are in open position and the aircraft is in motion, a wake is generated downstream from these elements.

This wake is manifested by a flow that is detached from the exterior surface of the fuselage and that is therefore perturbed.

Under certain circumstances, for example in the case of sideslip, the wake generated by opening of the trapdoors of a landing gear perturbs a large zone of the exterior surface of the aircraft by following a steeply ascending trajectory instead of flowing underneath and along the fuselage.

Furthermore, the aircraft are also provided with other projecting elements such as transducers for physical variables, such as aerodynamic sensors measuring static or dynamic pressure or measuring the orientation of the airstreams at the location at which they are positioned.

In order to ensure optimal measurement precision, these transducers must be placed in a flow that is not detached, or in general not perturbed.

As it happens, the wake caused by opening of a door or trapdoor may falsify the measurements made by the transducers when it reaches the zones in which these transducers are positioned.

SUMMARY OF THE INVENTION

The purpose of the present invention is to remedy this disadvantage by proposing an aircraft provided with:
  a wall having an exterior surface in contact with air flows external to the aircraft,
  an internal cavity in the aircraft, recessed relative to the exterior surface of the wall,
  at least one mobile trapdoor, which in closed position prolongs the exterior surface in such a way as to shut off the cavity from the exterior, and which in open position projects relative to the exterior surface in such a way as to open the cavity to the exterior,
characterized in that it is provided with at least one mobile aerodynamic deflector, whose movement is slaved to that of the said at least one trapdoor, the said at least one aerodynamic deflector projecting relative to the exterior surface in a zone thereof situated outside the zone covered by the said at least one trapdoor when the said at least one trapdoor is open.

The aerodynamic deflector positioned in a zone influenced by the wake produced by opening a trapdoor interacts with this wake to control the trajectory, in such a way that, for example, it does not perturb the functioning of the transducers.

Trajectory control may consist, for example, of straightening the perturbing flow generated by opening a trapdoor of a landing gear, in such a way that this flow does not ascend too far over the opposite lateral flanks of the aircraft and does not perturb the transducers.

By associating the retraction and deployment movements of the deflector respectively with the closing and opening movements of the trapdoor, it is ensured that the deflector will be used only when necessary.

Thus, when the cavity is closed, the deflector or deflectors are not extended and therefore do not generate any local perturbation in the external air flow passing over the aircraft.

It will be noted that, if two trapdoors are used to shut off the internal cavity, two deflectors may be used, one on each side of the cavity, or even a plurality on each side.

According to one characteristic, the said at least one aerodynamic deflector is mechanically attached to the said at least one trapdoor.

Thus slaving of the movements is achieved simply by mechanically connecting the trapdoor and the associated deflector or deflectors.

According to one characteristic, the said at least one aerodynamic deflector comprises a first part known as active part, which projects relative to the exterior surface when the trapdoor is opened and which is retracted when the trapdoor is closed.

Only one part of the deflector is disposed on the exterior of the aircraft in the case of opening of the trapdoor.

According to one characteristic, the said at least one aerodynamic deflector comprises a second part connected in articulated manner to the said at least one trapdoor.

This second part ensuring the mechanical connection with the trapdoor is generally disposed in the interior of the aircraft, since it does not participate in control of the wake associated with opening the trapdoor.

For example, the second part of the deflector is connected by an articulated arm to the said trapdoor or to at least one trapdoor.

According to one characteristic, the said at least one aerodynamic deflector is mounted pivotally around a fixed shaft.

Thus the opening or closing movement alone of the trapdoor causes pivoting of the deflector around the shaft and extension or retraction thereof.

For example, the two parts of the said at least one aerodynamic deflector extend on both sides of the fixed shaft.

The fixed shaft is, for example, disposed at the level of the aircraft wall in order to make the parasitic drag associated with this installation negligible.

According to one characteristic, the pivot shaft of the said at least one aerodynamic deflector is substantially parallel to the pivot shaft of the said at least one trapdoor, which simplifies transmission of the movement of the shaft to the deflector.

Thus the movements of the trapdoor and of the deflector take place in neighboring, or even identical, planes in the case of perfect parallelism of their axes of rotation.

According to one characteristic, the pivot shaft of the said at least one trapdoor is parallel to the longitudinal direction of the aircraft fuselage.

According to one characteristic, as seen in transverse section of the aircraft fuselage, an aerodynamic deflector is located at the level of at least one of the two parts of the exterior surface of the fuselage wall that extend upwardly on both sides of the internal cavity.

This transverse arrangement of the aerodynamic deflector or deflectors makes it possible to control the perturbing wake generated by the trapdoor and extending in particular in transverse manner.

According to one characteristic, the projecting part of the said at least one deflector has the form of a plate of general longitudinal shape that is disposed along the aircraft fuselage.

Such a shape makes it possible to direct the perturbing flows in the general longitudinal direction, thus limiting transverse propagation of these flows.

According to one characteristic, one or more transducers is or are positioned on the exterior surface of the wall in such a way that the said at least one aerodynamic deflector is positioned between one or more transducers and the trapdoor.

This deflector or these deflectors thus deflect the perturbing flows in order to retard them or even to prevent them from reaching the transducer or transducers, which are placed on the trajectory that these flows would follow in the absence of aerodynamic barriers or partitions.

Preferably the deflector or deflectors, the transducer or transducers and the trapdoor are disposed in substantially transverse manner.

BRIEF DESCRIPTION OF THE DRAWINGS

Other characteristics and advantages will be come apparent in the course of the description hereinafter, given solely by way of non-limitative example and written with reference to the attached drawings, wherein:

FIG. 4 is a schematic side view showing the longitudinal positioning of an aerodynamic deflector relative to the trapdoors of the front landing gear;

FIGS. 5a to 5e are schematic views showing different possible shapes of a leading end of an aerodynamic deflector according to the invention;

FIGS. 6a to 6e are schematic views showing different possible forms of a trailing end of an aerodynamic deflector according to the invention.

DETAILED DESCRIPTION OF THE INVENTION ARE

Figure 1:
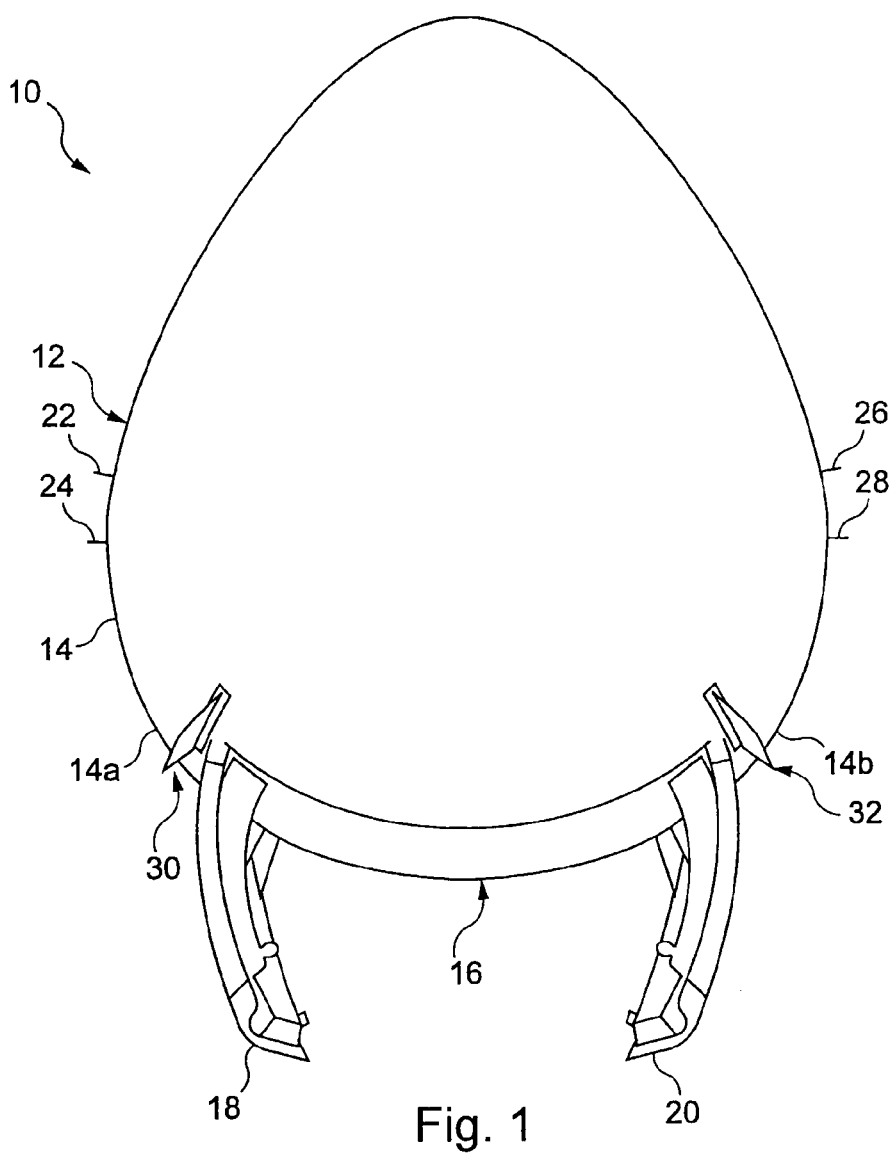
FIGS. 1 and 2 are respectively general schematic front elevations of an aircraft fuselage with the trapdoors of the front landing gear in open position and in closed position.

As illustrated in FIG. 1 and designated in general by reference 10, an aircraft represented schematically in front elevation in a transverse plane comprises a fuselage 12 bounded by a wall 14.

In the lower part of the fuselage, wall 14 has substantially semicircular shape, and in the upper part thereof it assumes a general dome-like or parabolic shape.

This wall 14 has an exterior surface that is in contact with the air flows external to the aircraft.

In the lower part of the fuselage, an internal cavity 16 is provided in the interior of the aircraft and is arranged in such a way that it is recessed relative to the exterior surface of wall 14.

In the exemplary embodiment represented in FIG. 1, this cavity contains the front landing gear of the aircraft.

A set of movable trapdoors 18, 20 makes it possible to shut off the cavity from the exterior or to open it to the exterior on command and according to needs, for example to extend the front landing gear if this cavity contains the landing gear or to permit dropping of objects such as bombs if the aircraft is a bomber.

Figure 2:
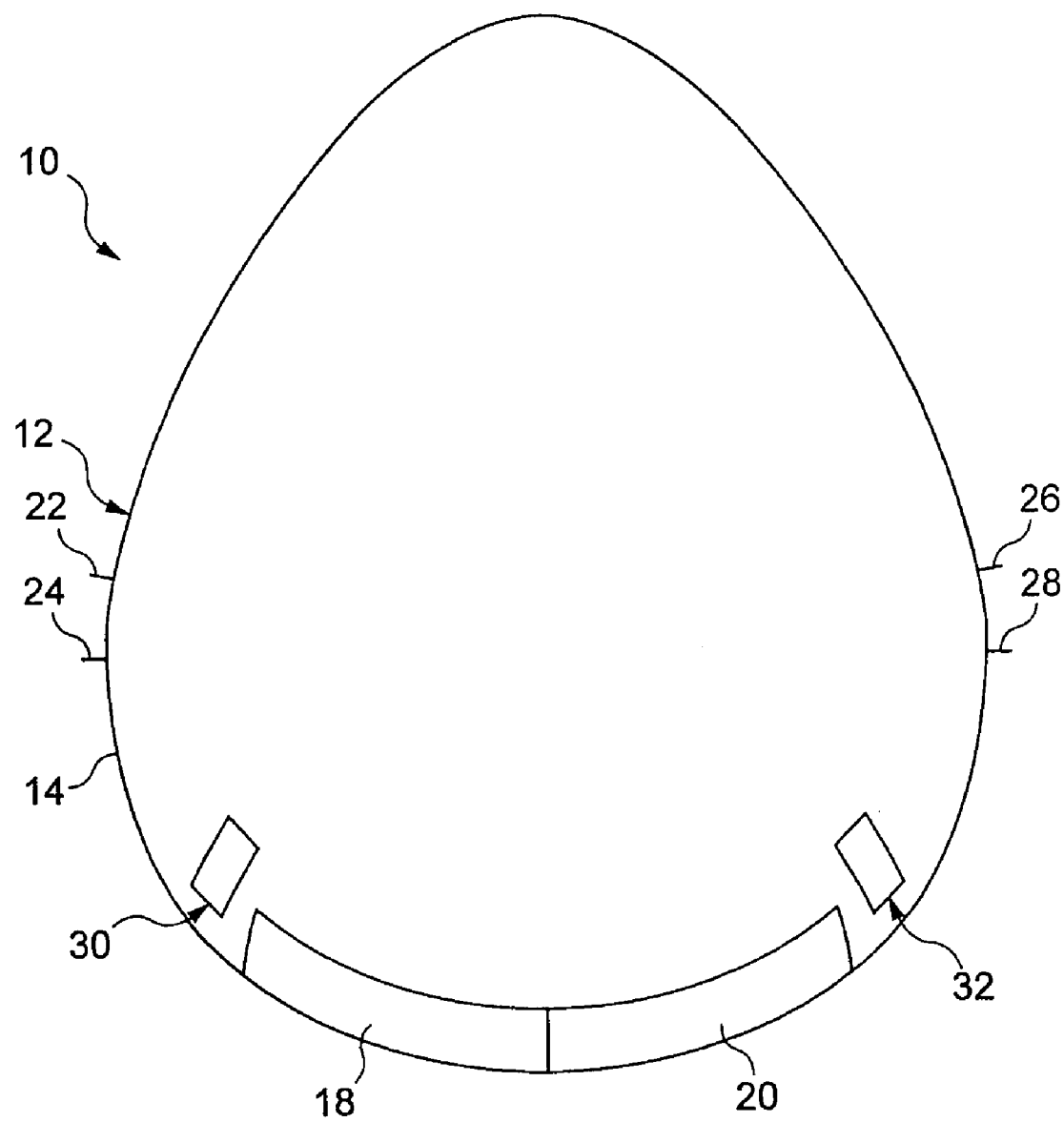

As illustrated in FIG. 2, when the trapdoors or doors 18 and 20 are closed, they prolong the exterior surface in its lower part and form the rounded or curved part of the fuselage.

A plurality of transducers measuring physical variables are positioned laterally on the exterior surface of the fuselage wall, substantially at mid-height, toward the end of the semi-rounded part of the fuselage.

Thus a pair of total pressure sensors 22, 24 and a pair of attack-angle sensors 26, 28, are each disposed on one of the two lateral flanks of the fuselage (FIG. 1).

To ensure optimal functioning of these transducers, the air flow over the exterior surface of the fuselage, perpendicular to these transducers, must not be detached.

When trapdoors 18 and 20 are open, as illustrated in FIG. 1, a perturbing flow or wake is generated on the exterior surface of the aircraft.

This wake originates at the doors or trapdoors 18, 20 (wake represented in FIG. 4 by the zone bounded by dashed lines and referenced 29 for door 20), and extends downstream in the longitudinal direction of the fuselage, rising over the sides of the fuselage on both lateral parts 14a and 14b of the exterior surface thereof and reaching transducers 22, 24, 26 and 28.

To prevent this wake from perturbing the measurements made by the transducers, a component for controlling the trajectory of this wake is provided and is positioned, as seen in transverse section, on the part of the exterior surface of the fuselage situated between the trapdoor generating the wake and the transducer or transducers in question.

Thus, in FIG. 1, two aerodynamic deflector components 30 and 32 are located respectively at the level of the two parts 14a and 14b of the exterior surface of the fuselage, on both sides of trapdoors 18 and 20.

The shape and positioning of the deflectors, whether, in the transverse view represented in FIG. 1 or along the fuselage (FIG. 4) will be described hereinafter.

Each deflector element for controlling the trajectory of the wake is movable between two extreme positions, and its movement is slaved to that of the trapdoor with which it is associated.

More particularly, the movement of the deflector is synchronized with that of the trapdoor. Thus, it is in a deployed position, in which it projects relative to the external surface of the aircraft, so as to interact with the wake generated by the trapdoor when the latter is open (FIGS. 1 and 3).

Figure 3:
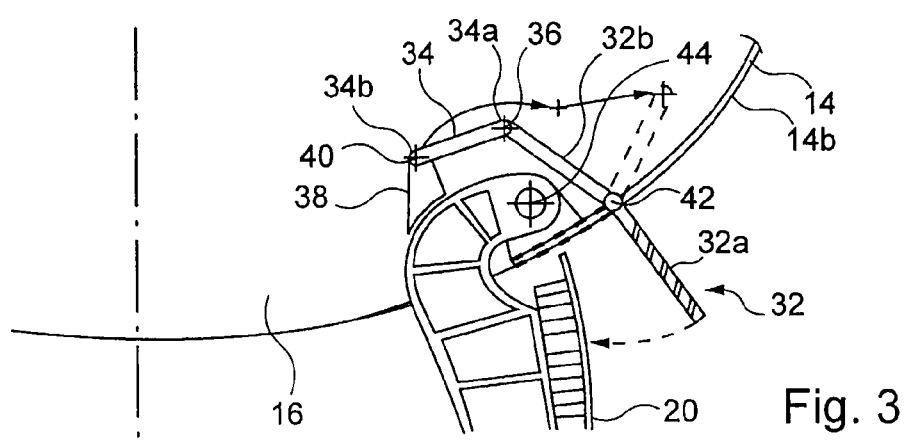
FIG. 3 is an enlarged partial schematic view of the part of FIG. 1 in transverse section showing a deflector associated with a trapdoor of the front landing gear.

On the other hand, when the trapdoor is closed and not generating any perturbing flow, the deflector is in a retracted position relative to the external surface, in order to offer as little surface as possible to the air flow in contact with the external surface of the aircraft (FIGS. 2 and 3).

It will be noted that each deflector is placed in a zone of the exterior surface situated outside the zone covered by the trapdoor during its opening and closing movement, or in other words outside internal cavity 16.

More particularly, as illustrated in FIG. 3, deflector element 32 is positioned immediately behind trapdoor 20, or in other words at a short radial distance therefrom as seen in transverse section of the aircraft.

It will be noted that the deflector may be slaved to the displacement of the trapdoor in question by a servo unit (specific actuator, for example controlled by an electronic equipment unit of the aircraft), or may be connected mechanically to the trapdoor in order that the movement of the latter causes movement of the deflector.

This second solution is simpler to implement than the first, because it does not involve additional elements such as an actuator and its control system, apart from the trapdoor and the deflector.

This solution is therefore also more reliable.

As illustrated in FIG. 3, deflector 32 (deflector 30 illustrated in FIG. 1 is identical to deflector 32) comprises two parts, including a first part known as active part 32a which projects relative to surface 14b when trapdoor 20 is open and which is retracted, in the present case folded along the wall as indicated by dashed lines in FIG. 3, when the trapdoor is closed.

The deflector comprises a second part 32b, which is connected in articulated manner to trapdoor 20 by an articulation arm 34. Of the two ends of arm 34, one end 34a is connected to the free end of the second part of deflector 32b by way of a pivot joint around a shaft 36, and the opposite end 34b is connected to an internal projecting end 38 of the trapdoor by way of a pivot joint around a shaft 40.

Furthermore, deflector 32 is mounted pivotally around a fixed shaft 42 disposed in wall 14, more or less parallel to the other shafts 36 and 40, which are also mounted parallel to pivot shaft 44 of the trapdoor.

It will be noted that the two parts 32a and 32b of the aerodynamic deflector extend on both sides of fixed shaft 42.

The fact that all of these shafts are substantially parallel to one another makes it possible to simplify the articulated connecting mechanism between the trapdoor and the deflector considerably.

As illustrated in FIG. 3 by dashed lines, element 38 is displaced to the right during closing of the trapdoor, exerting thrust on arm 34 and therefore on the free end of second part 32b of the deflector, thus causing it to be displaced to the right to occupy the position represented by dashed lines (these movements are permitted by virtue of the pivot joints at shafts 36 and 40). Because of this fact, pivoting of first part 32a of the deflector to the left then takes place, and the first part becomes inserted in a recess provided in the wall, becoming flush with the surface and thus conforming with the curvature of the fuselage.

It will be noted that, in this exemplary embodiment, the second part of the deflector remains permanently inside the fuselage.

Alternatively, however, the deflector could be constituted of only a single part, which would be almost entirely extended from the fuselage during each opening of the trapdoor, albeit with the exception of a base or of a retaining foot in the interior of the fuselage.

It is to be noted that, in extended or deployed position of the deflector, active part 31a thereof is locally disposed in a manner substantially perpendicular to exterior surface 14b of the fuselage.

Other connection systems or mechanisms may be used to connect the deflector to the trapdoor and thus to permit deployment or retraction thereof synchronically with the opening or closing of the trapdoor.

For example, a cam may be disposed on the internal part of the trapdoor to cooperate with the end of the deflector situated in the interior of the fuselage.

The shape of the cam is chosen in such a way that, in the course of displacement of the trapdoor, the internal free end of the deflector follows a cam profile capable of causing the desired displacement (extension or retraction) of the projecting part of the deflector.

In such a case, the deployment or folding movement of the deflector will therefore not necessarily be a pivoting movement, but, for example, may take the form of a translational movement substantially perpendicular to the wall of the fuselage.

In simple manner, the cam profile may consist of a mobile ramp along which the free end of the deflector is displaced.

Projecting part 32 of the deflector has the form of a longitudinal plate, as illustrated in FIG. 4.

This plate is situated slightly upstream from trapdoor 20, but has a longitudinal overlap therewith.

Such an arrangement imparts good effectiveness to the deflector.

It is observed that, in the presence of the deflector, the wake generated by opening of trapdoor 20 is represented by hatched zone 50. Thus the wake passes underneath transducer 28, whereas, in the absence of deflector, wake 29 passes over the transducer and perturbs its measurements.

Such a plate, for example, has the following dimensions: length (longitudinal dimension) of 605 millimeters and height (considered in the plane of FIG. 3 and in a direction locally substantially perpendicular to the exterior surface of the fuselage) of 110 millimeters.

Its thickness is, for example, 3 millimeters, a value that ensures a good compromise between sufficient mechanical resistance to the forces and a limited weight.

It will be noted that the effect brought about by the aerodynamic deflector or partition depends on the ratio between the length and height of the deflector.

For the deflector to be effective, the ratio of its length to its height must be greater than 1, generally between 4 and 7 (beyond 7, the deflector loses its effectiveness), and preferably close to 5.5.

Furthermore, in the exemplary embodiment illustrated in the figures, the leading end of the deflector has a substantially parabolic shape as seen in a plane parallel to the plane containing the deflector.

Such a shape makes it possible to control the effectiveness of the deflector.

It will be noted that the deflector may nevertheless assume all kinds of shapes and, in particular, its leading end may take on the shapes represented in FIGS. 5a, 5b, 5c, 5d and 5e, for example.

It therefore is seen that the leading end may be straight and perpendicular to the flow (FIG. 5a), follow a curving arc (FIG. 5b), be straight with constant inclination (FIG. 5c), be both straight and curved (FIG. 5d) and be straight with a fixed inclination inverted by comparison with that of FIG. 5c (FIG. 5e).

Similarly, the trailing ends of the deflector may assume different shapes, such as straight lines, curving arcs or a combination of the two as illustrated in FIGS. 6a to 6e.

In addition, in order to minimize the noise generated where the air flow meets the leading and trailing ends of the deflector, these ends are rounded along their edges.

The invention claimed is:
1. An aircraft comprising:
a wall having an exterior surface in contact with air flows external to the aircraft;
an internal cavity in the aircraft recessed relative to the exterior surface of the wall;
at least one mobile trapdoor which in a closed position prolongs the exterior surface in such a way as to shut off the cavity from the exterior, and which in an open position projects relative to the exterior surface in such a way as to open the cavity to the exterior;
a transducer positioned on the exterior surface of the wall; and at least one mobile aerodynamic deflector whose movement is slaved to that of the at least one trapdoor, the at least one mobile aerodynamic deflector deflecting airflow from the at least one mobile trapdoor when the at least one mobile trapdoor is in the open position such that the airflow from the at least one mobile trapdoor is deflected away from the transducer.

2. The aircraft according to claim 1, wherein the at least one aerodynamic deflector is mechanically attached to the at least one trapdoor.

3. The aircraft according to claim 1, wherein the transducer is an air pressure sensor.

4. The aircraft according to claim 1 or 2, wherein the at least one aerodynamic deflector comprises a first part known as active part, which projects relative to the exterior surface when the trapdoor is open and which is retracted when the trapdoor is closed.

5. The aircraft according to claim 4, wherein the at least one aerodynamic deflector comprises a second part connected in articulated manner to the said at least one trapdoor.

6. The aircraft according to claim 4, wherein the active part of the at least one deflector has the form of a plate of general longitudinal shape that is disposed along an aircraft fuselage.

7. The aircraft according to claim 1, wherein the at least one aerodynamic deflector is mounted pivotally around a fixed shaft.

8. The aircraft according to claim 7, wherein two parts of the at least one aerodynamic deflector extend on both sides of the fixed shaft.

9. The aircraft according to claim 7, wherein the fixed shaft of the at least one aerodynamic deflector is substantially parallel to a pivot shaft of the at least one trapdoor.

* * * * *